US012297636B2

United States Patent
McIntosh (10) Patent No.: US 12,297,636 B2
(45) Date of Patent: May 13, 2025

(54) SYSTEMS AND METHODS FOR CLEANING A FLOOR OF A LAVATORY WITHIN AN INTERNAL CABIN OF A VEHICLE

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/974,663

(22) Filed: Oct. 27, 2022

(65) Prior Publication Data

US 2024/0141634 A1 May 2, 2024

(51) Int. Cl.
| | | |
|---|---|---|
| *E03D 9/00* | (2006.01) | |
| *B08B 1/16* | (2024.01) | |
| *B08B 1/30* | (2024.01) | |
| *B08B 5/04* | (2006.01) | |
| *B08B 13/00* | (2006.01) | |
| *B08B 17/02* | (2006.01) | |
| *B64D 11/02* | (2006.01) | |

(52) U.S. Cl.
CPC .............. *E03D 9/002* (2013.01); *B08B 1/165* (2024.01); *B08B 1/30* (2024.01); *B08B 5/04* (2013.01); *B08B 13/00* (2013.01); *B08B 17/02* (2013.01); *B64D 11/02* (2013.01)

(58) Field of Classification Search
CPC ......... E03D 9/002; B08B 1/005; B08B 1/008; B08B 5/04; B08B 13/00; B08B 17/02; B64D 11/02
See application file for complete search history.

(56) References Cited

U.S. PATENT DOCUMENTS

| | | | |
|---|---|---|---|
| 10,065,740 B2 | 9/2018 | Childress | |
| 10,982,439 B2 | 4/2021 | Childress | |
| 2005/0249955 A1* | 11/2005 | Gedeon | A01N 55/00 |
| | | | 428/421 |
| 2016/0128526 A1* | 5/2016 | Dobrinsky | A61L 2/10 |
| | | | 4/233 |
| 2016/0220716 A1* | 8/2016 | Childress | B64D 11/02 |
| 2017/0284076 A1* | 10/2017 | Jensen | E03D 9/002 |
| 2018/0016778 A1* | 1/2018 | Arnott | A47L 11/4044 |

FOREIGN PATENT DOCUMENTS

| | | | | |
|---|---|---|---|---|
| CN | 109826463 A | * | 5/2019 | |
| CN | 109296042 B | * | 9/2020 | ............. E03D 9/002 |
| GB | 2549192 A | * | 10/2017 | ............. B64D 11/02 |

OTHER PUBLICATIONS

Machine translation of CN-109296042-B (Year: 2020).*
Machine translation of CN-109826463-A (Year: 2019).*

* cited by examiner

*Primary Examiner* — Erin F Bergner
(74) *Attorney, Agent, or Firm* — Joseph M. Butscher; The Small Patent Law Group LLC (57) ABSTRACT

A cleaning system and method for an enclosed space include a floor including a hydrophobic material configured to repel liquid. One or more wipers are configured to sweep one or both of the liquid or debris off the floor, such as into an inlet of a vacuum.

23 Claims, 6 Drawing Sheets

SYSTEMS AND METHODS FOR CLEANING A FLOOR OF A LAVATORY WITHIN AN INTERNAL CABIN OF A VEHICLE

FIELD OF THE DISCLOSURE

Examples of the present disclosure generally relate to systems and methods for cleaning a floor of a lavatory within an internal cabin of a vehicle, such as a commercial aircraft.

BACKGROUND OF THE DISCLOSURE

Commercial aircraft are used to transport passengers between various locations. During a flight—particularly a trans-oceanic or other long haul flight—passengers are typically confined within certain areas of an aircraft. Various individuals (such as passengers, pilots, flight attendants, and the like) use certain internal portions of an aircraft during a flight. For example, numerous individuals may use a lavatory within an internal cabin during a flight.

As can be appreciated, with each use, the cleanliness of a lavatory onboard an aircraft may be compromised. Individuals onboard may be sensitive to health risks presented by a frequently-used lavatory onboard an aircraft. Indeed, as individuals use a lavatory onboard an aircraft, the likelihood of germs and bacteria therein increases.

An aircraft lavatory is generally cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights, and/or may include a brief, less thorough cleaning (such as only countertops being wiped). As such, the floor, for example, may be overlooked.

With repeated use, portions of the floor of the lavatory may be covered with liquids. Even after being cleaned, the floor of the lavatory may be wet from cleaning fluids. A wet lavatory floor may be unsettling to individuals, even if they know the floor is clean. That is, a wet floor may give the impression or perception of unsanitary conditions. Further, a wet floor may pose a safety hazard in that an individual may slip and fall on the wet floor.

Accordingly, dry floor assemblies have been developed. Examples of such dry floor assemblies include U.S. Pat. No. 10,065,740, entitled "Systems and Methods for Cleaning a Lavatory Floor," and U.S. Pat. No. 10,982,439, entitled "Dry Floor Liquid Disposal System." However, the dry floor assemblies can be complex. Further, manufacturing processes for such assemblies can be time and labor intensive.

SUMMARY OF THE DISCLOSURE

A need exists for an effective and efficient system and method for cleaning a floor of a lavatory, such as within an internal cabin of a vehicle.

With those needs in mind, certain examples of the present disclosure provide a cleaning system for an enclosed space. The cleaning system includes a floor including a hydrophobic material configured to repel liquid. One or more wipers are configured to sweep one or both of the liquid or debris off the floor.

In at least one example, the cleaning system also includes a vacuum having an inlet. The one or more wipers are configured to sweep one or both of the liquid or the debris off the floor and into the inlet of the vacuum.

The enclosed space can be a lavatory. The lavatory can be within an internal cabin of a vehicle.

In at least one example, the floor is formed of the hydrophobic material. In at least one example, the hydrophobic material forms an exposed upper surface of the floor.

The cleaning system can also include a control unit configured to operate the one or more wipers. In at least one example, one or more sensors are configured to detect an occupancy status of the enclosed space. The control unit is in communication with the one or more sensors. The control unit is configured to operate the one or more wipers when the enclosed space is unoccupied.

In at least one example, the control unit is in communication with a lock of a door of the enclosed space. The control unit is configured to operate the one or more wipers based on one or more signals received from the lock.

The cleaning system can also include an actuating device operatively coupled to the one or more wipers. The actuating device is configured to be engaged by an individual to manually operate the one or more wipers.

In at least one example, the one or more wipers include a flexible blade configured to contact the floor.

Certain examples of the present disclosure provide a cleaning method for an enclosed space. The cleaning method includes sweeping, by one or more wipers, one or both of the liquid or debris off a floor including a hydrophobic material that repels the liquid. In at least one example, said sweeping includes sweeping, by the one or more wipers, one or both of the liquid or the debris off the floor and into an inlet of a vacuum. In at least one example, said sweeping occurs only when the enclosed space is unoccupied. In at least one example, the cleaning method includes manually engaging an actuating device coupled to the one or more wipers to cause said sweeping.

Certain examples of the present disclosure provide a vehicle including an internal cabin, a lavatory within the internal cabin, and a cleaning system within the lavatory, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for cleaning a floor, such as within a lavatory of an internal cabin of a vehicle. The systems and methods are configured to remove liquids from floor. In at least one example, the floor is formed of or coated with a hydrophobic material. As such, the systems and methods can include a synthetic hydrophobic floor surface, which causes liquid droplets to gather and bead, and be efficiently conveyed across the floor surface. A wiper, such as a mechanical floor wiper (which can be or otherwise include a silicon rubber wiper blade, a replaceable wet cloth, and/or a replaceable dry cloth with a spray nozzle) can be operated by an attendant, a motorized actuator, a manual foot pedal, and/or the like to sweep the liquid over the floor into a vacuum (for example, an inlet of a vacuum). The vacuum generates negative airflow, which draws in the swept liquid, thereby removing the liquid droplets from the floor. The vacuum inlet is at the end of a path of travel of the wiper. The liquid (and small debris) can then be extracted into a toilet waste drain via the vacuum. The hydrophobic material causes liquid on the floor to be bead into liquid droplets, which are efficiently and effectively swept by the wiper and drawn into the vacuum.

In at least one example, the wiper can be operated only in an unoccupied lavatory. For example, a control unit configured to operate the wiper can be in communication with a presence sensor and/or a lock that indicate when the lavatory is unoccupied. For example, when the door is unlocked and closed, the control unit may determine that the lavatory is unoccupied (such as immediately after a door is unlocked, opened, and subsequently closed). In at least one other example, a proximity sensor and/or a presence sensor (for example, a heat sensor, a motion sensor, an infrared sensor, an ultrasonic sensor, a pressure sensor such as an electronic scale, and/or the like) can be used to detect an occupancy status of the lavatory.

Figure 1:
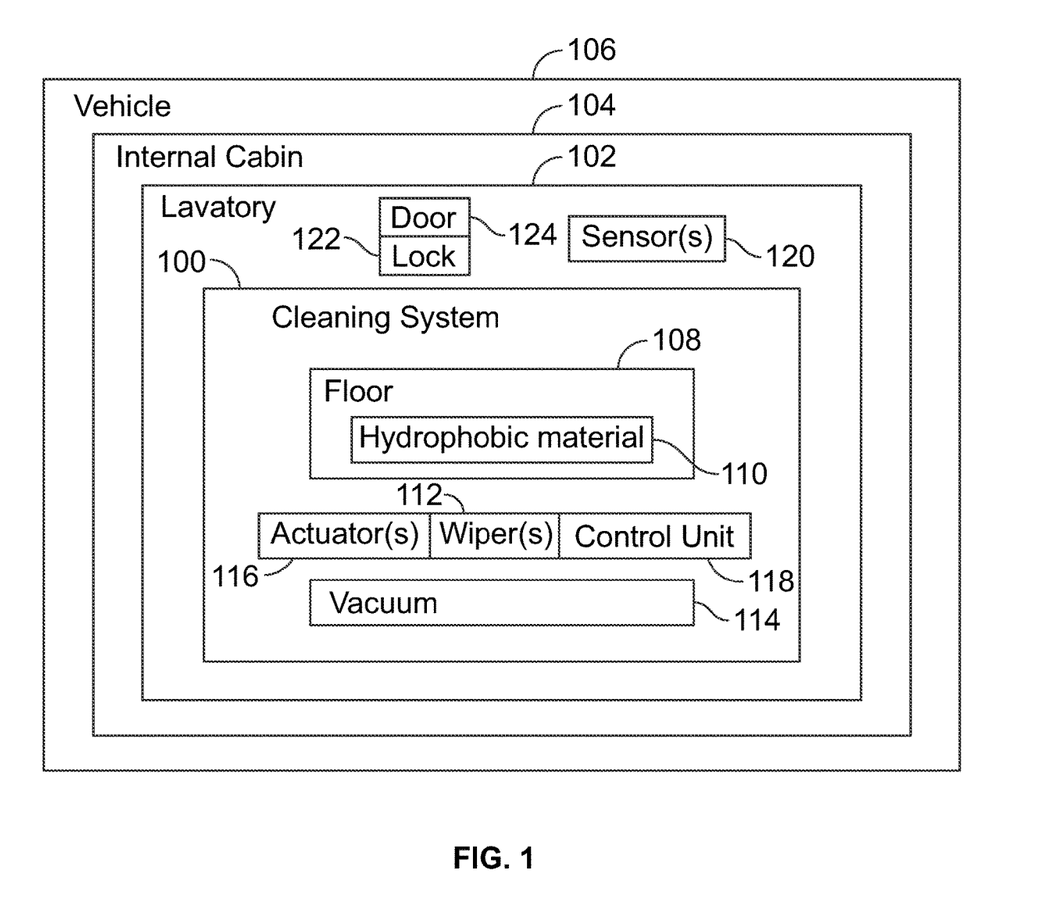
FIG. 1 illustrates a schematic block diagram of a cleaning system for a lavatory within an internal cabin of a vehicle, according to an example of the present disclosure.

FIG. 1 illustrates a schematic block diagram of a cleaning system 100 for a lavatory 102 within an internal cabin 104 of a vehicle 106, according to an example of the present disclosure. The lavatory 102 is an example of an enclosed space. The vehicle 106 can be a commercial aircraft. As another example, the vehicle 106 can be a land-based vehicle, such as a bus, van, train car, or the like. As another example, the vehicle 106 can be a watercraft, such as a cruise ship or cargo ship. As another example, the vehicle 106 can be a spacecraft. Optionally, the cleaning system 100 can be used with respect to enclosed spaces of fixed structures, such as residential or commercial buildings, and/or public restrooms or lavatories.

The cleaning system 100 includes a floor 108 including a hydrophobic material 110. In at least one example, the floor 108 is formed of the hydrophobic material 110. In at least one other example, the floor 108 is coated with the hydrophobic material 110. For example, an exposed upper surface 111 of the floor 108 can be coated with the hydrophobic material 110. The hydrophobic material 110 has a low surface energy such that liquids do not wet or bond to the hydrophobic material 110. In at least one example, the hydrophobic material 110 includes non-polar molecules that repel bodies of water. Examples of the hydrophobic material 110 include alkanes, oils, fats, and/or the like. The hydrophobic material can be a superhydrophobic or an ultra-hydrophobic material.

The cleaning system 100 also includes one or more wipers 112 proximate to the floor 108. In at least one example, the wiper(s) 112 can be or otherwise include a silicon rubber wiper blade, a replaceable wet cloth, and/or a replaceable dry cloth coupled with a spray nozzle. The wiper(s) 112 are configured to move over the hydrophobic material 110 of the floor 108 to sweep water droplets, small debris, and the like into a vacuum 114. Because the floor 108 includes the hydrophobic material 110, liquids beads on the surface of the floor 108, which allows the wiper(s) 112 to easily, efficiently, and effectively sweep the liquids off the floor 108.

The wiper(s) 112 are coupled to one or more actuators 116 that are configured to move the wiper(s) 112 in relation to the floor 108. The actuator(s) 116 can be or otherwise include one or more of linkages (such as wires, cables, chains, arms, beams, and/or the like), a motor (such as a rotary motor), and/or the like. In at least one example, a control unit 118 is in communication with the actuator(s) 116, such as via a wired or wireless connection. In this example, the control unit 118 is configured to control operation of the actuator(s) 116 to move the wiper(s) 112 in relation to the floor 108.

The control unit 118 can also be in communication with one or more sensors 120 and/or a lock 122 or a door 124 of an enclosed space (for example, the lavatory 102), such as via one or more wired or wireless connections. The sensor(s) 120 can be configured to detect an occupancy status of the lavatory 102. For example, the sensor(s) 120 can be or otherwise include a heat sensor, a motion sensor, an infrared sensor, an ultrasonic sensor, a pressure sensor (such as an electronic scale), and/or the like. In at least one example, the control unit 118 operates the wiper(s) 112 to sweep liquid and debris off the floor 108 and into the vacuum 114 when the lavatory 102 is unoccupied, as determined through signals output by the one or more sensors 120.

In at least one other example, the control unit 118 can determine the occupancy status of the lavatory 102 through signals received from the lock 122. For example, the control unit 118 can be configured to determine the occupancy status of the lavatory 102 through a locking sequence of the lock 122. As an example, the control unit 118 can determine that the lavatory 102 is unoccupied in response to detecting signal output by the lock 122 indicating that the door 124 has been unlocked, opened, and then closed in an unlocked state.

As such, the control unit 118 can determine an occupancy status from the sensor(s) 120 and/or the lock 122. The control unit 118 can operate the wiper(s) 112 to sweep liquid and debris off the floor 108 and into the vacuum 114 when the lavatory 102 is unoccupied. Alternatively, the cleaning system 100 can be operated even if the lavatory 102 is occupied. In at least one other example, the control unit 118 may not be in communication with the sensor(s) 120 and/or the lock 122. In at least one other example, the cleaning system 100 may not include the control unit 118. Instead, the wiper(s) 112 can be manually operated, such as via an actuation device, such as a foot pedal, lever arm, handle, and/or the like.

In operation, the hydrophobic material 110 of the floor 108 causes liquid to bead, thereby forming liquid droplets. The wiper(s) 112 are then operated, such as automatically by the control unit 118 or manually via an actuating device, to sweep the liquid and/or debris toward and into an inlet of the vacuum 114, which generates negative air pressure that draws the liquid and debris therein. The vacuum 114 can be in fluid communication with a drain, such as a toilet waste drain of the lavatory 102, to ensure that the liquid and debris is removed from the lavatory 102.

Any liquid deposited onto the floor 108 gathers and beads on contact with the floor 108, due to the hydrophobic material 110. The wiper(s) 112 can then be manually operated, such as via a manual actuating device, or automatically operated, such as via the control unit 118 operating the actuator 116, to move the liquid (and debris) over the floor 108 and into the vacuum 114. In at least one example, the control unit 118 may ensure that the wiper(s) 112 is only operated when the lavatory 102 is unoccupied. For example, the control unit 118 can prevent or otherwise restrict movement of the wiper(s) 112 in response to detecting that the lavatory 102 is occupied by an individual.

Figure 2:
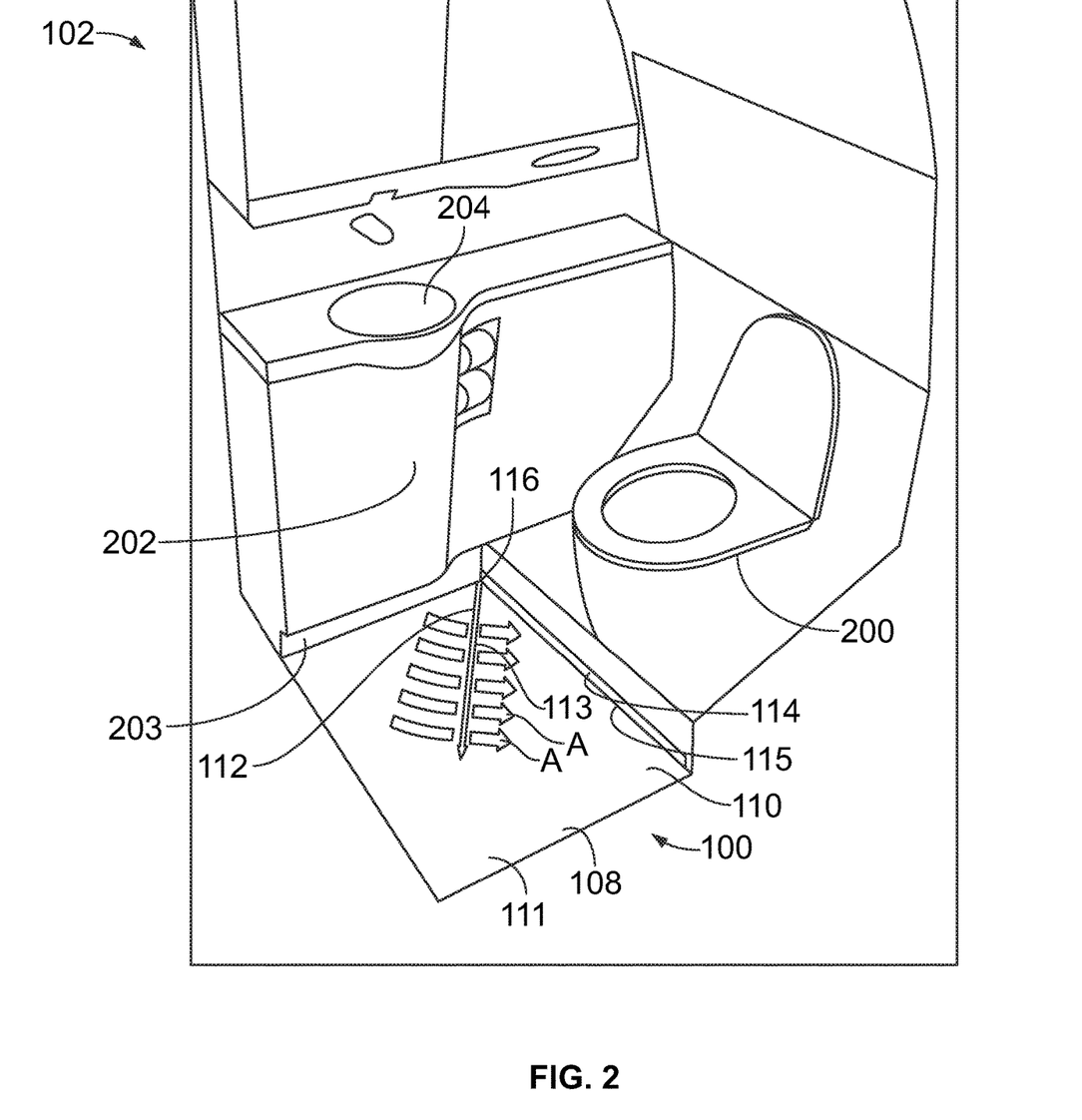
FIG. 2 illustrates a perspective internal view of a lavatory, according to an example of the present disclosure.

As described herein, the cleaning system 100 is for an enclosed space. The cleaning system 100 includes the floor 108 including the hydrophobic material 110 configured to repel liquid. One or more wipers 112 are configured to sweep one or both of the liquid or debris off the floor 108. In at least one example, the cleaning system 100 also includes a vacuum 114 having an inlet 115 (as shown in FIG. 2). The one or more wipers 112 are configured to sweep one or both of the liquid or the debris off the floor 108 and into the inlet 115 of the vacuum 114. In at least one example, the enclosed space is a lavatory 102, such as can be within an internal cabin 104 of a vehicle 106. In at least one example, the floor 108 is formed of the hydrophobic material 110. In at least one example, the hydrophobic material 110 forms an exposed upper surface 111 (shown in FIG. 2) of the floor 108.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 118 may be or include one or more processors that are configured to control operation, as described herein.

The control unit 118 is configured to execute a set of instructions that are stored in one or more data storage units or elements (such as one or more memories), in order to process data. For example, the control unit 118 may include or be coupled to one or more memories. The data storage units may also store data or other information as desired or needed. The data storage units may be in the form of an information source or a physical memory element within a processing machine.

The set of instructions may include various commands that instruct the control unit 118 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 118. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 118 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 2 illustrates a perspective internal view of a lavatory 102, according to an example of the present disclosure. The lavatory 102 may be onboard an aircraft, as described herein. Optionally, the lavatory 102 may be onboard various other vehicles. In other embodiments, the lavatory 102 may be within a fixed structure, such as a commercial or residential building, public restrooms or lavatories, or the like.

The lavatory 102 includes the floor 108 that supports a toilet 200, cabinets 202, and a sink 204. The floor 108 includes the hydrophobic material 110, which forms an exposed upper surface 111 (that is, the surface on which an individual can stand) of the floor 108. As shown, the cleaning system 100 includes a wiper 112 including an arm 113 pivotally coupled to an actuator 116 (such as a rotary link, motor, or the like) at a corner of the floor 108. The arm 113 can be a linear beam having a wiping agent, such as a silicon flap, dry or wet cloth, or the like that contacts the exposed upper surface 111. During operation, the wiper 112 moves from a stored position (such as within a toe kick area 203 underneath the cabinet 202) toward an inlet 115 of the vacuum 114 in the direction of arrows A. In at least one example, the inlet 115 is at a terminal end of a sweep of the wiper 112. In this manner, the wiper 112 is configured to sweep liquid and debris over the hydrophobic material 110 of the floor 108, which repels liquid, into the inlet 115 of the vacuum 114, which in turns draws in the liquid and/or debris, thereby removing the liquid and/or debris from the floor 108.

Optionally, the cleaning systems 100 described herein can be used in settings other than within lavatories. For example, the cleaning system 100 can be used in galleys, kitchens, swimming pool decks, patios, porches, public entryways (hotel lobbies, restaurants, bars, shopping centers, libraries, courts house, etc.) and/or various other areas that can be susceptible to wet floors.

As noted, the wiper 112 can include a silicon or rubber wiper blade that contacts the exposed upper surface 111 of the floor 108. As another example, the wiper 112 can include a replaceable wet cloth. As another example, the wiper 112 can include a replaceable dry cloth, and a spray nozzle, which can be secured to the wiper 112, a portion of the floor 108 or another component within the lavatory 102, can be used to dispense cleaning fluid onto the floor 108 in front of the wiper 112 as it moves toward the inlet 115 of the vacuum 114. The spray nozzle can be in fluid communication with a bottle of the cleaning fluid via one or more tubes. The bottle can be retained within the cabinet 202, for example.

In at least one example, the wiper 112 moves over a radial arc of ninety degrees from the stored position to the inlet 115 of the vacuum 114. The wiper 112 moves from the stored position to the inlet 115 to sweep liquid and debris into the inlet 115 of the vacuum 114. After such motion, the wiper 112 pivots back in an opposite direction to the stored position. During such return motion, the wiper 112 can be lifted off the floor 108 to ensure that liquid is not moved toward the stored position.

Figure 3:
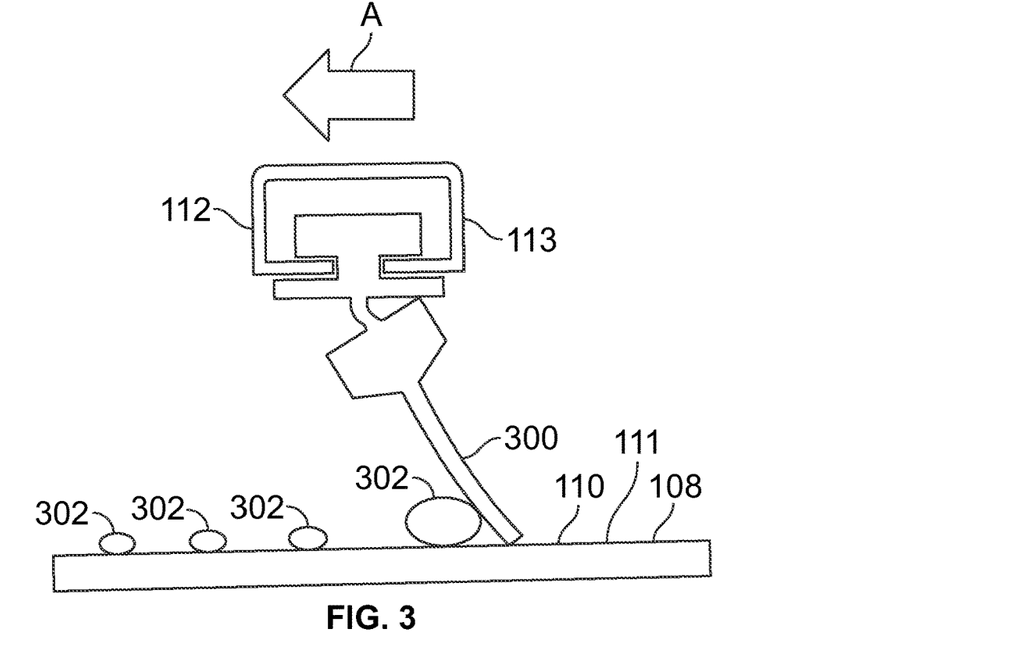
FIG. 3 illustrates a lateral view of a wiper in relation to a floor, according to an example of the present disclosure.

FIG. 3 illustrates a lateral view of the wiper 112 in relation to the floor 108, according to an example of the present disclosure. In at least one example, the wiper 112 includes a flexible silicon and/or rubber blade 300 that contacts the floor 108, and sweeps liquid droplets 302 off the floor 108 as the wiper 112 and arm 113 move in the direction of arc A (shown in FIGS. 2 and 3). The hydrophobic material 110 of the floor 108 causes the liquid droplets 302 to bead on the exposed upper surface 111 and slide off the floor 108 when the blade 300 moves over the floor 108 and into the liquid droplets 302.

Figure 4:
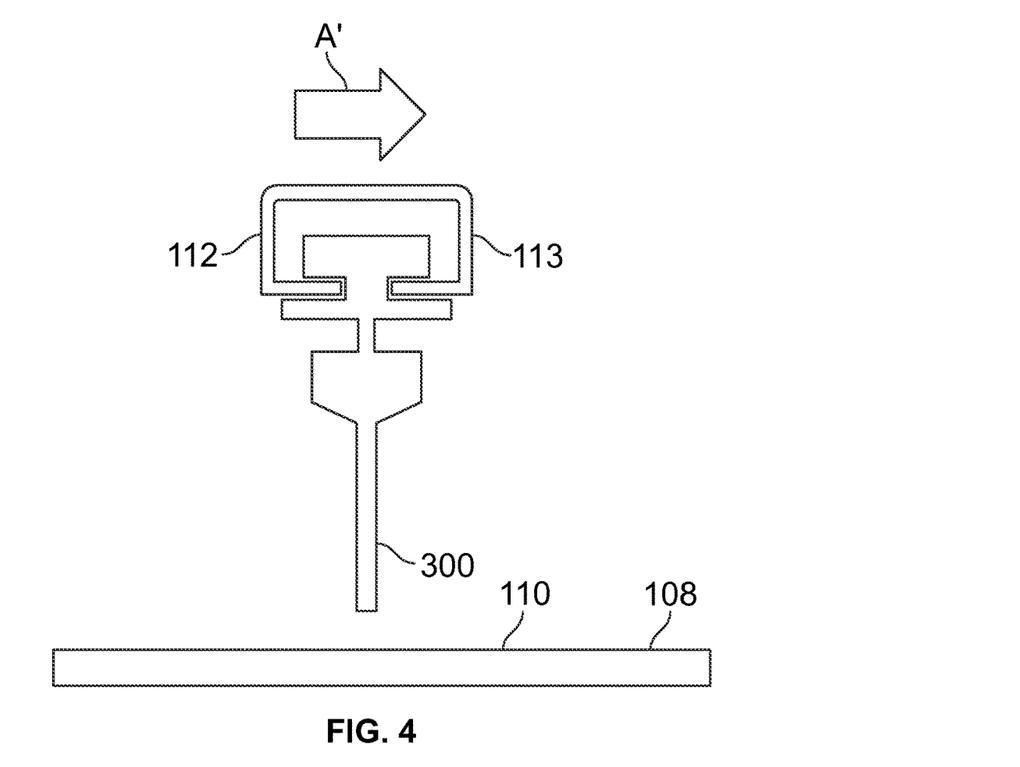
FIG. 4 illustrates a lateral view of the wiper in relation to a floor during a return movement toward a stored position, according to an example of the present disclosure.

FIG. 4 illustrates a lateral view of the wiper 112 in relation to the floor 108 during a return movement toward a stored position, according to an example of the present disclosure. Referring to FIGS. 1-4, when the wiper 112 and arm 113 move away from the inlet 115 of the vacuum 114 toward the stored position in the direction of arc A', the wiper 112 can be lifted upwardly, such as via an actuator 116, so that the blade 300 does not contact the floor 108, thereby ensuring that liquid is not moved toward the stored position. Alternatively, the blade 300 may remain in contact with the floor 108 as the wiper 112 moves back toward the stored position.

Figure 5:
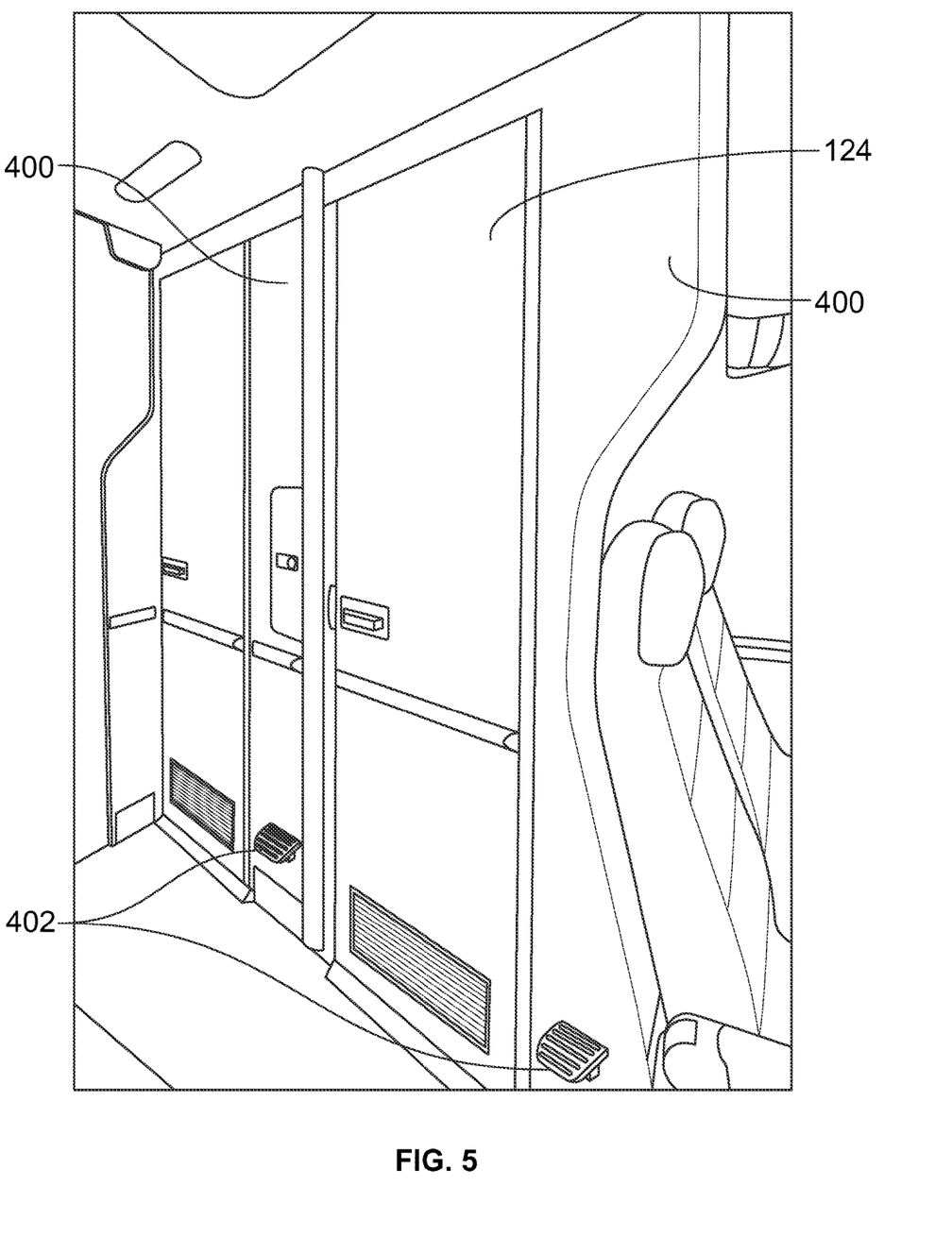
FIG. 5 illustrates a perspective outer view of a lavatory, according to an example of the present disclosure.

FIG. 5 illustrates a perspective outer view of the lavatory 102, according to an example of the present disclosure. The door 124 is in a closed position, as shown in FIG. 5. The door 124 couples to one or more walls 400. An actuating device 402 can be moveably coupled to the walls 400 and/or the door 124. The actuating device 402 can be coupled to the wiper 112 such as through one or more mechanical linkages. As shown, the actuating device 402 can be a foot pedal that is configured to be engaged by a foot of an individual to manually operate the wiper(s) 112 (shown in FIGS. 1-4).

Optionally, the actuating device 402 can be a lever, a handle, a button, and/or the like. In at least one example, the actuating device 402 can be inoperative when the lavatory 102 is occupied by an individual. For example, a moveable locking device can engage the actuating device 402 when the lavatory 102 is occupied. The moveable locking device can be operatively coupled to the lock 122 of the door 124, such as through one or more linkages, which prevents the actuating device 402 from being operated when the lock 122 is set in a locked position.

As described, in at least one example, the actuating device 402 is operatively coupled to the one or more wipers 112. The actuating device 402 is configured to be engaged by an individual to manually operate the one or more wipers 112. Optionally, the cleaning system 100 may not include the actuating device 402.

Figure 6:
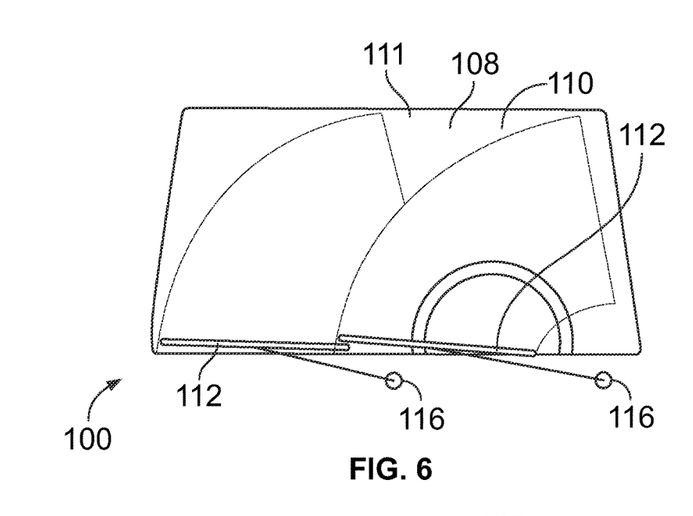
FIG. 6 illustrates a top view of a floor, according to an example of the present disclosure.

FIG. 6 illustrates a top view of a floor 108, according to an example of the present disclosure. As shown, the cleaning system 100 can include two wipers 112 configured to move in the same directions.

Figure 7:
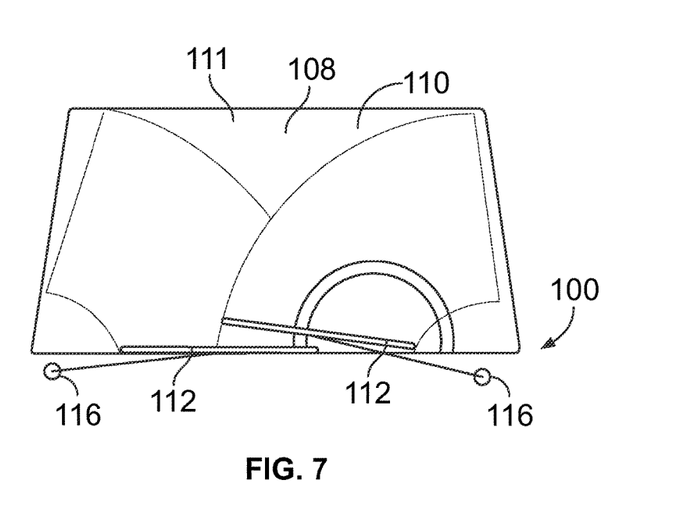
FIG. 7 illustrates a top view of a floor, according to an example of the present disclosure.

FIG. 7 illustrates a top view of a floor 108, according to an example of the present disclosure. In this example, the two wipers 112 can be configured to move in opposite directions.

Figure 8:
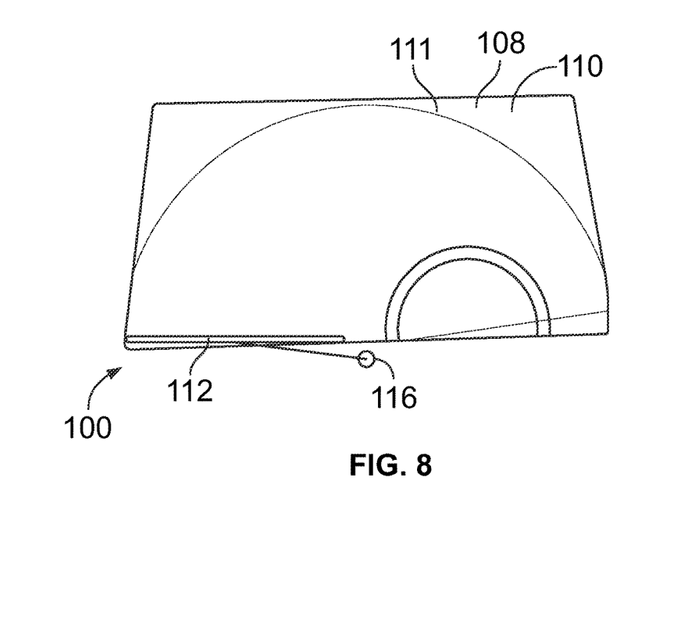
FIG. 8 illustrates a top view of a floor, according to an example of the present disclosure.

FIG. 8 illustrates a top view of a floor 108, according to an example of the present disclosure. In this example, the cleaning system 100 includes a single wiper 112, which can be configured to move over a travel path of 180 degrees.

Figure 9:
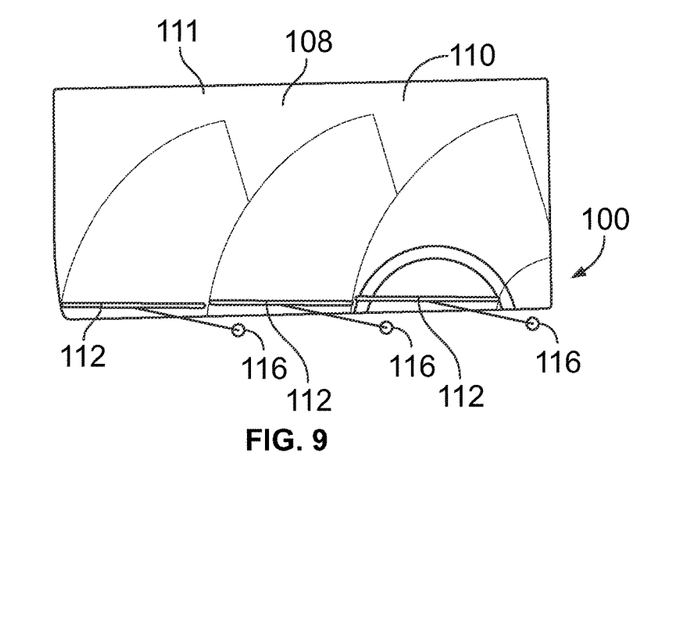
FIG. 9 illustrates a top view of a floor, according to an example of the present disclosure.

FIG. 9 illustrates a top view of a floor 108, according to an example of the present disclosure. In this example, the cleaning system 100 can include three wipers 112, which are configured to move in the same direction. Optionally, the wipers 112 can move in different directions.

FIGS. 6-9 show examples of configurations of wipers, directions of travel, and travel paths. It is to be understood that these are merely examples, and the cleaning system 100 can include more or less wipers 112 than shown. Further, the wipers 112 can move over greater or less distances than shown. Also, the wipers 112 can move in different direction than shown.

Figure 10:
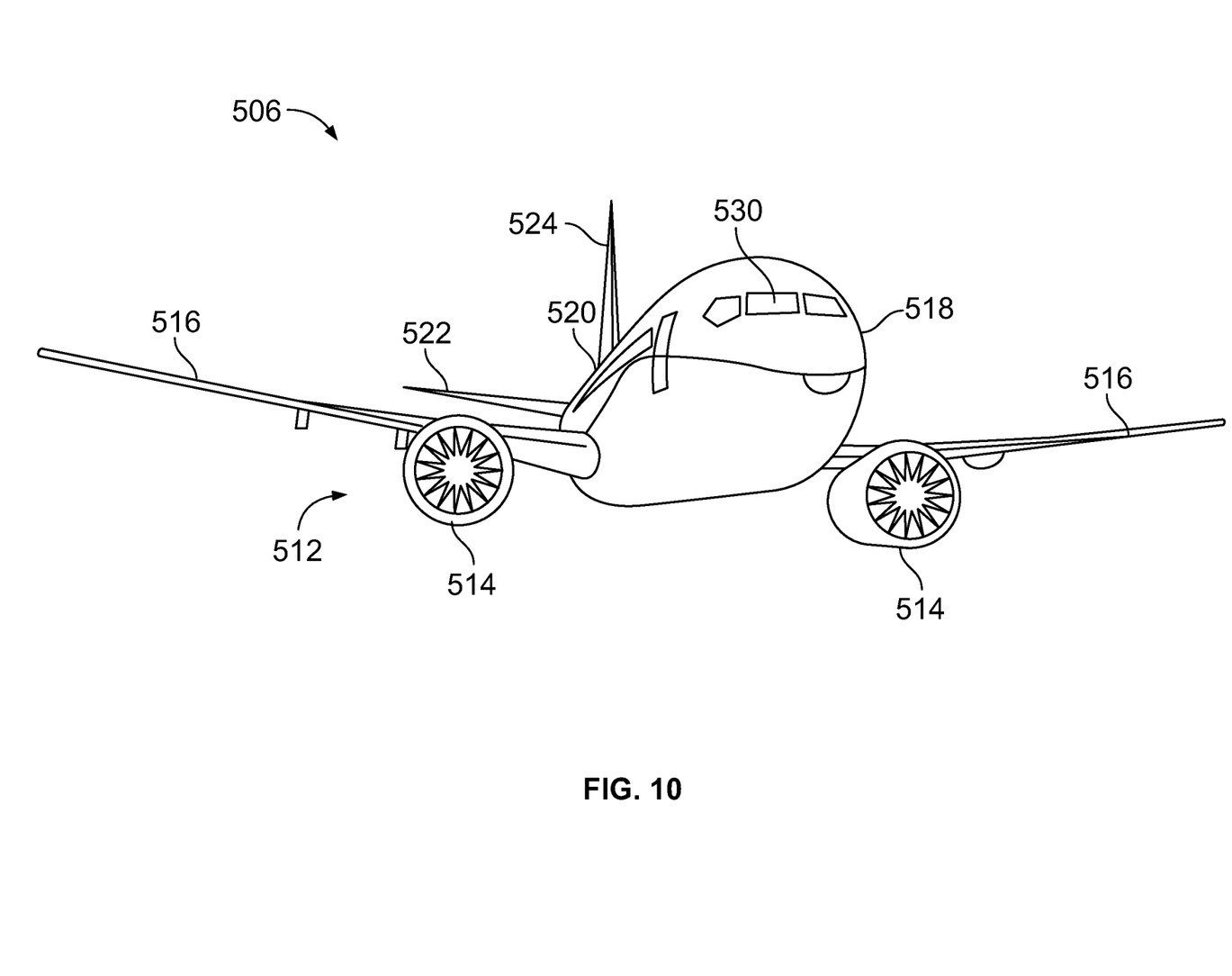
FIG. 10 illustrates a perspective front view of an aircraft, according to an example of the present disclosure.

FIG. 10 illustrates a perspective front view of an aircraft 506, according to an embodiment of the present disclosure. The aircraft 506 is an example of the vehicle 106 shown in FIG. 1. The aircraft 506 includes a propulsion system 512 that includes engines 514, for example. Optionally, the propulsion system 512 may include more engines 514 than shown. The engines 514 are carried by wings 516 of the aircraft 506. In other embodiments, the engines 514 may be carried by a fuselage 518 and/or an empennage 520. The empennage 520 may also support horizontal stabilizers 522 and a vertical stabilizer 524.

The fuselage 518 of the aircraft 506 defines an internal cabin 530, which includes a flight deck or cockpit, one or more work sections (for example, galleys, personnel carry-on baggage areas, and the like), one or more passenger sections (for example, first class, business class, and coach sections), one or more lavatories, and/or the like. The cleaning systems, as shown and described herein, can be used within the internal cabin 530, such as within an enclosed space (for example, a lavatory or galley) of the internal cabin 530.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings, public restrooms or lavatories, and/or the like.

Further, the disclosure comprises examples according to the following clauses:

Clause 1. A cleaning system for an enclosed space, the cleaning system comprising:
  a floor including a hydrophobic material configured to repel liquid; and
  one or more wipers configured to sweep one or both of the liquid or debris off the floor.

Clause 2. The cleaning system of Clause 1, further comprising a vacuum having an inlet, wherein the one or more wipers are configured to sweep one or both of the liquid or the debris off the floor and into the inlet of the vacuum.

Clause 3. The cleaning system of Clauses 1 or 2, wherein the enclosed space is a lavatory.

Clause 4. The cleaning system of Clause 3, wherein the lavatory is within an internal cabin of a vehicle.

Clause 5. The cleaning system of any of Clauses 1-4, wherein the floor is formed of the hydrophobic material.

Clause 6. The cleaning system of any of Clauses 1-5, wherein the hydrophobic material forms an exposed upper surface of the floor.

Clause 7. The cleaning system of any of Clauses 1-6, further comprising a control unit configured to operate the one or more wipers.

Clause 8. The cleaning system of Clause 7, further comprising one or more sensors configured to detect an occupancy status of the enclosed space, wherein the control unit is in communication with the one or more sensors, and wherein the control unit is configured to operate the one or more wipers when the enclosed space is unoccupied.

Clause 9. The cleaning system of Clauses 7 or 8, further comprising a lock of a door, wherein the control unit is in communication with the lock, and wherein the control unit is configured to operate the one or more wipers based on one or more signals received from the lock.

Clause 10. The cleaning system of any of Clauses 1-9, further comprising an actuating device operatively coupled to the one or more wipers, wherein the actuating device is configured to be engaged by an individual to manually operate the one or more wipers.

Clause 11. The cleaning system of any of Clauses 1-10, wherein the one or more wipers comprises a flexible blade configured to contact the floor.

Clause 12. A cleaning method for an enclosed space, the cleaning method comprising:
  sweeping, by one or more wipers, one or both of the liquid or debris off a floor including a hydrophobic material that repels the liquid.

Clause 13. The cleaning method of Clause 12, wherein said sweeping comprises sweeping, by the one or more wipers, one or both of the liquid or the debris off the floor and into an inlet of a vacuum.

Clause 14. The cleaning method of Clauses 12 or 13, wherein said sweeping occurs only when the enclosed space is unoccupied.

Clause 15. The cleaning method of any of Clauses 12-14, manually engaging an actuating device coupled to the one or more wipers to cause said sweeping.

Clause 16. A vehicle comprising:
  an internal cabin;
  a lavatory within the internal cabin; and
  a cleaning system within the lavatory, the cleaning system comprising:
    a floor including a hydrophobic material configured to repel liquid;
    one or more wipers configured to sweep one or both of the liquid or debris off the floor; and
    a vacuum having an inlet, wherein the one or more wipers are configured to sweep one or both of the liquid or the debris off the floor and into the inlet of the vacuum.

Clause 17. The vehicle of Clause 16, further comprising a control unit configured to operate the one or more wipers.

Clause 18. The vehicle of Clause 17, further comprising one or more sensors configured to detect an occupancy status of the lavatory, wherein the control unit is in communication with the one or more sensors, and wherein the control unit is configured to operate the one or more wipers when the enclosed space is unoccupied; and Clause 19. The vehicle of Clauses 17 or 18, wherein the lavatory further comprises a door including a lock, and wherein the control unit is configured to operate the one or more wipers based on one or more signals received from the lock.

Clause 20. The vehicle of any of Clauses 16-19, further comprising an actuating device operatively coupled to the one or more wipers, wherein the actuating device is configured to be engaged by an individual to manually operate the one or more wipers.

As described herein, examples of the present disclosure provide effective and efficient systems and methods for cleaning a floor of a lavatory, such as within an internal cabin of a vehicle.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cleaning method for a vehicle comprising:
   an internal cabin;
   a lavatory within the internal cabin; and
   a cleaning system within the lavatory, the cleaning system comprising:
      a floor including a hydrophobic material configured to repel liquid;
      one or more wipers configured to radially move over the floor to sweep one or both of the liquid or debris off the floor, wherein the one or more wipers include one or more portions that directly contact the floor; and
      a vacuum having an inlet, wherein the one or more wipers are configured to sweep one or both of the liquid or the debris off the floor and into the inlet of the vacuum, wherein the one or more wipers are configured to pivotally move in a first direction from a stored position toward the inlet, wherein the one or more portions directly contact the floor when the one or more wipers pivotally move in the first direction, wherein the one or more wipers are configured to pivotally move in a second direction from the inlet toward the stored position, and wherein the one or more wipers are lifted off the floor when the one or more wipers pivotally move in the second direction so that the one or more portions do not contact the floor,
   the cleaning method comprising:
      radially sweeping, by the one or more wipers that directly contact the floor including the hydrophobic material that repels the liquid, one or both of the liquid or the debris off the floor including the hydrophobic material that repels the liquid.

2. The cleaning method of claim 1, wherein said radially sweeping comprises sweeping, by the one or more wipers, one or both of the liquid or the debris off the floor and into the inlet of the vacuum.

3. The cleaning method of claim 1, wherein said radially sweeping occurs only when the enclosed space is unoccupied.

4. The cleaning method of claim 1, further comprising manually engaging an actuating device coupled to the one or more wipers to cause said radially sweeping.

5. A vehicle comprising:
   an internal cabin;
   a lavatory within the internal cabin; and
   a cleaning system within the lavatory, the cleaning system comprising:
      a floor including a hydrophobic material configured to repel liquid;
      one or more wipers configured to radially move over the floor to sweep one or both of the liquid or debris off the floor, wherein the one or more wipers include one or more portions that directly contact the floor; and
      a vacuum having an inlet, wherein the one or more wipers are configured to sweep one or both of the liquid or the debris off the floor and into the inlet of the vacuum, wherein the one or more wipers are configured to pivotally move in a first direction from a stored position toward the inlet, wherein the one or more portions directly contact the floor when the one or more wipers pivotally move in the first direction, wherein the one or more wipers are configured to pivotally move in a second direction from the inlet toward the stored position, and wherein the one or more wipers are lifted off the floor when the one or more wipers pivotally move in the second direction so that the one or more portions do not contact the floor.

6. The vehicle of claim 5, further comprising a control unit configured to operate the one or more wipers.

7. The vehicle of claim 6, further comprising one or more sensors configured to detect an occupancy status of the lavatory, wherein the control unit is in communication with the one or more sensors, and wherein the control unit is configured to operate the one or more wipers when the enclosed space is unoccupied.

8. The vehicle of claim 6, wherein the lavatory further comprises a door including a lock, and wherein the control unit is configured to operate the one or more wipers based on one or more signals received from the lock.

9. The vehicle of claim 5, further comprising an actuating device operatively coupled to the one or more wipers, wherein the actuating device is configured to be engaged by an individual to manually operate the one or more wipers.

10. A vehicle comprising:
    an enclosed space; and
    a cleaning system within the enclosed space, the cleaning system comprising:
       a floor including a hydrophobic material;
       one or more wipers configured to radially move over the floor, wherein the one or more wipers include one or more portions that directly contact the floor; and
       a vacuum having an inlet, wherein the one or more wipers are configured to pivotally move in a first direction from a stored position toward the inlet, wherein the one or more portions directly contact the floor when the one or more wipers pivotally move in the first direction, wherein the one or more wipers are configured to pivotally move in a second direction from the inlet toward the stored position, and wherein the one or more wipers are lifted off the floor when the one or more wipers pivotally move in the second direction so that the one or more portions do not contact the floor.

11. The vehicle of claim 10, wherein the enclosed space is a lavatory.

12. The vehicle of claim 10, wherein the hydrophobic material forms an exposed upper surface of the floor.

13. The vehicle of claim 10, further comprising a control unit configured to operate the one or more wipers.

14. The vehicle of claim 13, further comprising one or more sensors configured to detect an occupancy status of the enclosed space, wherein the control unit is in communication with the one or more sensors, and wherein the control unit is configured to operate the one or more wipers when the enclosed space is unoccupied.

15. The vehicle of claim 13, further comprising a lock of a door, wherein the control unit is in communication with the lock, and wherein the control unit is configured to operate the one or more wipers based on one or more signals received from the lock.

16. The vehicle of claim 10, further comprising an actuating device operatively coupled to the one or more wipers, wherein the actuating device is configured to be engaged by an individual to manually operate the one or more wipers.

17. The vehicle of claim 10, wherein the one or more wipers comprise a flexible blade, wherein the one or more portions include the flexible blade.

18. The vehicle of claim 10, wherein the one or more wipers comprise an arm pivotally coupled to an actuator at a corner of the floor.

19. The vehicle of claim 10, wherein the one or more wipers are configured to pivotally move from the stored position underneath a cabinet toward the inlet.

20. The vehicle of claim 10, wherein the one or more wipers comprises two wipers.

21. The vehicle of claim 20, wherein the two wipers are configured to move in the same direction.

22. The vehicle of claim 20, wherein the two wipers are configured to move in opposite directions.

23. The vehicle of claim 16, wherein the actuating device is a foot pedal moveably coupled to one or more walls or a door.

* * * * *